US010223573B2

(12) United States Patent
George et al.

(10) Patent No.: US 10,223,573 B2
(45) Date of Patent: Mar. 5, 2019

(54) USER IDENTIFICATION AND IDENTIFICATION-BASED PROCESSING FOR A VIRTUAL REALITY DEVICE

(71) Applicant: Adobe Inc., San Jose, CA (US)

(72) Inventors: William Brandon George, Pleasant Grove, UT (US); Kevin Gary Smith, Lehi, UT (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/377,029

(22) Filed: Dec. 13, 2016

(65) Prior Publication Data

US 2018/0165506 A1 Jun. 14, 2018

(51) Int. Cl.
*G06K 9/00* (2006.01)
*G06F 3/01* (2006.01)

(52) U.S. Cl.
CPC .......... *G06K 9/00087* (2013.01); *G06F 3/011* (2013.01); *G06K 9/00013* (2013.01)

(58) Field of Classification Search
CPC ..... G06F 21/32; G06F 3/011; G06K 19/0716; G06K 9/00087; G06K 9/00013; G06T 19/006
USPC ................................ 382/124, 154, 209, 218
See application file for complete search history.

(56) References Cited

U.S. PATENT DOCUMENTS

| 9,270,740 B2 | 2/2016 | Smith et al. |
| 9,477,966 B2 | 10/2016 | Hewett et al. |
| 9,681,165 B1* | 6/2017 | Gupta ................ H04N 21/2541 |
| 2016/0358181 A1* | 12/2016 | Bradski ............ G06Q 20/40145 |
| 2017/0206691 A1* | 7/2017 | Harrises .................. G06T 11/60 |
| 2017/0364920 A1* | 12/2017 | Anand ............ G06Q 20/40145 |
| 2018/0040161 A1* | 2/2018 | Tierney ................. G06T 19/006 |

* cited by examiner

*Primary Examiner* — Daniel G Mariam
(74) *Attorney, Agent, or Firm* — Finch & Maloney PLLC

(57) ABSTRACT

A virtual reality device is configured to generate realistic images, sounds and other sensations that replicate a real or imagined environment for a user. As a first user interacts with the device, first user interaction data representing interactions between the first user and the device during a first user visit are recorded. A first unique visitor fingerprint is generated based on the first user interaction data. As a second user interacts with the device, second user interaction data representing interactions between the second user and the device during a second user visit that is different from the first user visit are recorded. A second unique visitor fingerprint is generated based on the second user interaction data. The first and second unique visitor fingerprints are compared to determine whether the second user is the same as the first user. Based on the determination, one or more functions can be performed.

17 Claims, 7 Drawing Sheets

USER IDENTIFICATION AND IDENTIFICATION-BASED PROCESSING FOR A VIRTUAL REALITY DEVICE

FIELD OF THE DISCLOSURE

This disclosure relates generally to digital media processing, and more particularly, to techniques for identifying a user of a virtual reality device and performing one or more functions based on the identified user.

BACKGROUND

Virtual reality (VR) devices are machines that use hardware and software to generate realistic images, sounds and other sensations that replicate a real or imagined environment. Virtual reality devices provide an immersive experience that allows users to, for example, look around the environment, manipulate objects in the environment, and hear sounds in the environment. With a system incorporating one or more VR devices, VR applications and other components, a user can virtually interact with the environment via one or more user interfaces of the system. User interfaces that are commonly found in VR systems may include, for example, a computer display, a projection screen, a VR headset, a VR hand glove, a treadmill, or any combination of these or other components. Additionally, sensors and cameras can be integrated into the system to detect user inputs, such as head and hand gestures, for allowing the user to virtually interact with the environment. At least some of these interfaces are specific to VR devices and are not typically available with other types of electronic devices, such as personal computers, smartphones, or tablets. Therefore, new techniques are needed for processing information received through interfaces that are specific to systems incorporating VR devices.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

Figure 1:
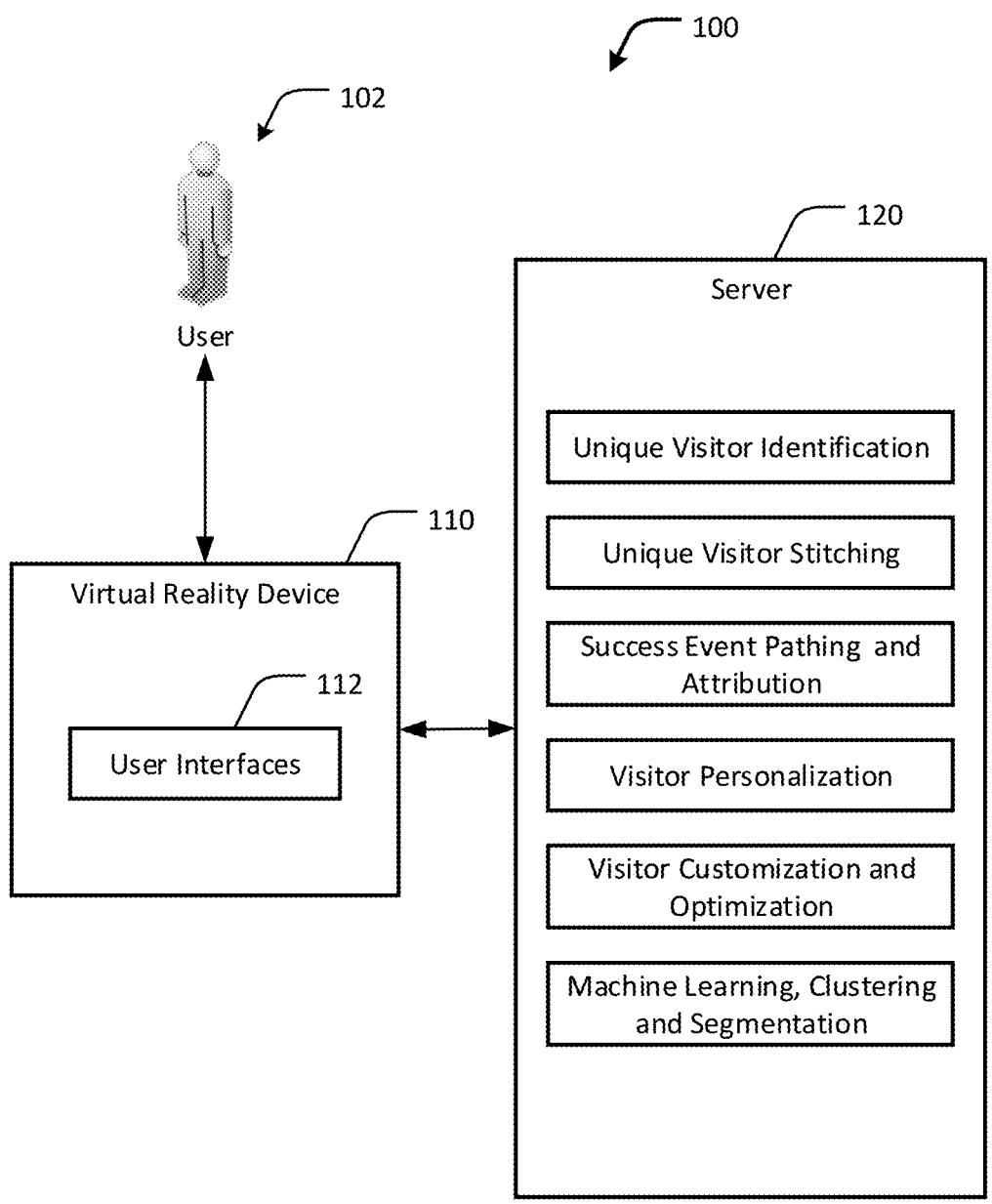
FIG. 1 shows an example system for identifying a user of a virtual reality device and performing one or more functions based on the identified user, in accordance with an embodiment of the present disclosure.

In accordance with an embodiment of the present disclosure, techniques are disclosed for identifying a user of a VR device and performing one or more functions based on the identified user. The disclosed techniques are particularly useful for uniquely identifying a user of the VR device in situations where no personally identifiable information (PII) is available for the user. User interactions with VR devices and VR applications can be collected and recorded during so-called user visits. A user visit is the presence of a user interacting with the VR device or application over a given period of time. Once obtained, the user interactions can be statistically analyzed to identify patterns that correspond to a particular, unique user. For instance, statistics representing interactions between a user and one or more VR devices or applications can be tabulated on a per user visit basis. Such interactions can include any inputs received by the VR device or application via interfaces between the user and one or more components of the system, such as sensors, switches/buttons, and cameras. Using this information, the interactions between the user and the VR device or application are statistically analyzed to generate a unique visitor fingerprint, as described in further detail below. The user of the VR device or application is identified by comparing this information to prior interactions with the device by the same user or other users. Similarities found during the comparison form the basis for uniquely identifying the user during a given visit. Once the user has been identified in this manner, a number of functions can be performed including personalizing and optimizing the user's experience with the VR device or application, enabling cross-device channel attribution, and combining information about a particular user collected from different VR devices or applications.

To this end, and in accordance with an embodiment of the present disclosure, a VR device is configured to generate realistic images, sounds and other sensations that replicate a real or imagined environment for a user. As a first user interacts with the VR device or a VR application running on the device, first user interaction data representing a first plurality of interactions between the first user and the VR device or application during a first user visit are recorded. A first unique visitor fingerprint is generated based on the first user interaction data. Further, as a second user interacts with the VR device (or another VR device or application), second user interaction data representing a second plurality of interactions between the second user and the VR device or application during a second user visit that is different from the first user visit are recorded. The second user may be the same as the first user, or the second user may be a different user. In either case, a second unique visitor fingerprint is generated based on the second user interaction data. The first and second unique visitor fingerprints are compared to determine whether or not the second user is the same as the first user or has at least some characteristics in common with the first user. Based on the determination, one or more functions can be performed, as will be described in further detail below. For example, an experience for the user can be personalized or one or more user preferences can be applied to the VR device or application to provide a better experience. Numerous configurations and variations will be apparent in light of this disclosure.

Overview

Virtual reality devices provide interfaces through which a user sends input and receives output. Through these interfaces, information about user behavior and user-specified device settings can be obtained and used to uniquely identify the user. For example, since VR headsets are worn on the user's head, the device can detect head movements, such as swivels, nods, image pans (e.g., looking from side to side) and image focus (e.g., holding the head steady while looking in a particular direction). Some VR devices can include sensors worn on the user's hand(s) that detect hand movements, such as waves, taps, selects (picking something up virtually), pushes and pulls, thumbs up or down, hand tilt, throwing motions, clapping, sign language and other gestures. Cameras mounted on some VR devices can be used to acquire visual information about the user's physical environment (e.g., location) and movements within that environment. Furthermore, some VR devices can detect eye movement or other biometric information, such as physical fingerprints, sweat, eye color, respiratory rate, or heart rate. Alternatively or in addition to the above-mentioned interfaces, information can be collected about user-specified settings provided by the VR device or application, such as head movement sensitivity, scroll speed, interface mappings, headphone volume, microphone volume, and screen brightness. Another example includes information about an application which provides the user with an option to dock (place) a file menu at the top, bottom, right or left side of a display screen (i.e., the docking location may be specific to some users). As such, VR devices and applications can provide metrics for generating unique visitor fingerprints, which can be used to uniquely identify users through their interactions via VR-specific interfaces.

In accordance with an embodiment of the present disclosure, statistics relating to distinct user visits on a VR device can be used to identify unique users, even in the absence of personally identifiable information about the user. From this information, a so-called visitor fingerprint can be generated for each unique user. Fingerprinting is the process of analyzing a user's settings, environment, and interactions with an electronic device, such as a VR device, or applications running on the device, to determine a set of criteria that uniquely distinguishes one user from another when the user does not provide personally identifiable information, such as an ID number, username or email address. Fingerprinting is useful when a device is shared among multiple users because it facilitates identification of a particular user during a given visit, even if the user is anonymously using the device or application. Fingerprinting is also useful when a single user uses multiple devices because it facilitates identification of a particular user regardless of which device is in use. For example, a combination of VR device and application settings, and behavioral acts such as head and hand movements, may be used to generate a fingerprint associated with a particular, unique user of the VR device. In another example, a visitor fingerprint may be generated using device features, such as VR device display, audio and sensitivity settings, and physical interactions with the device, such as the angle at which a VR headset is held and the swipe speed of the user using a VR hand glove.

A visitor fingerprint can be used to link information about the distinct user visits together, so that information about a prior visit with a particular user can be used to enhance the performance of a current or subsequent visit with the same user. For example, if the interactions between a user and a VR device or application in two user visits have similar statistics, then it is likely that the same user was involved in both visits. In this case, any number of different functions can be performed when the user is identified based on prior interactions with the VR device or application. For instance, according to an embodiment of the present disclosure, the VR device or application can be personalized for a particular user once the user has been identified. In one example, device- or application-specific settings, such as screen brightness, audio volume, gameplay preferences, or other such settings can be personalized by the user as desired. If only one user ever interacts with the VR device, then the personalized settings can be persistent in the device, since no other users interact with the device. However, if multiple users interact with the same VR device, then the personalization may be different for each user. To ensure that the device is personalized for each user, the personalized settings can be automatically selected once the user is identified.

Example System

FIG. 1 shows an example system 100 for identifying a user of a virtual reality device and performing one or more functions based on the identified user, in accordance with an embodiment of the present disclosure. The system 100 includes a virtual reality device 110 and at least one server 120 or other computing device, which can be separate from the VR device 110 or included in the VR device 110. One or more users 102 interact with the VR device 110 via one or more user interfaces 112. The server 120 is configured to process various inputs to the VR device via the user interfaces 112 and generate statistics relating to the interactions between the user 102 and the VR device 110. These statistics can be used by the server 120 to provide a number of services, including but not limited to unique visitor identification, unique visitor stitching, success event pathing and attribution, visitor personalization, visitor customization and optimization, machine learning, clustering and segmentation, as described in further detail below. Although in general the system 100 is designed to operate in situations where the identity of the user 102 is not known with certainty, the system 100 can provide additional benefits where the user 102 provides a form of positive identification, such as a username, identification number, email address, credit card number, or other personally identifiable information (PII). However, it will be understood that the system 100 does not need PII to provide the services variously described in this disclosure.

Figure 2:
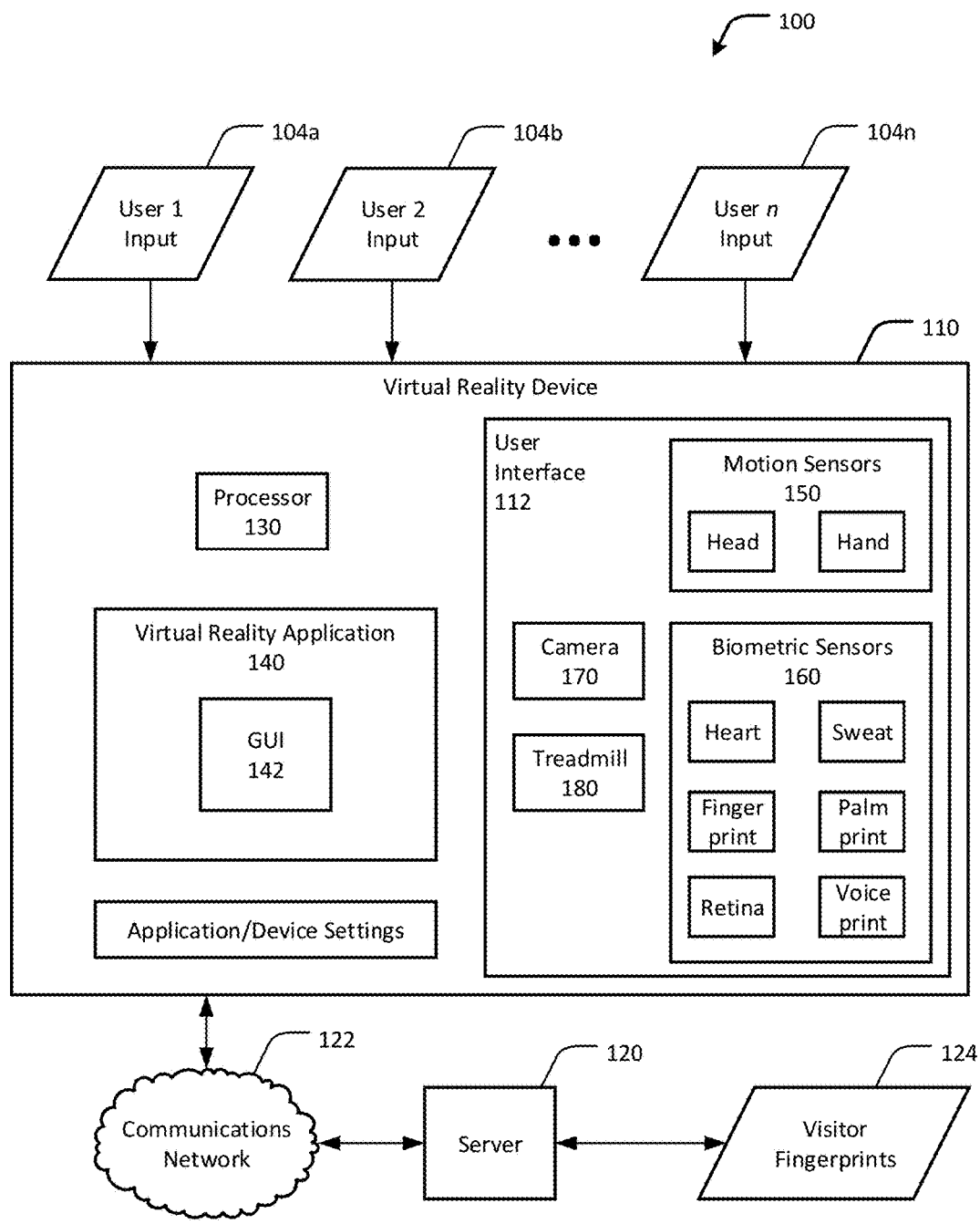
FIG. 2 illustrates a detailed view of the example system of FIG. 1 including a VR device, in accordance with an embodiment of the present disclosure.

FIG. 2 illustrates a detailed view of the example VR device 110 of FIG. 1, in accordance with an embodiment of the present disclosure. The VR device 110 includes one or more processors 130 configured to execute a virtual reality application 140. The VR application 140 is configured to receive one or more user inputs 104a, 104b, . . . , 104n, from the user 102 via the user interface 112. The VR application 140 is further configured to receive and to display images via a graphical user interface 142. Components of the user interface 112 can vary depending on a particular application, but in general may include, for example, interfaces to one or more motion sensors 150 (e.g., sensors to detect head or hand motion), one or more biometric sensors 160 (e.g., sensors to detect heart rate, sweat, physical fingerprints, palm prints, retinas, voice prints, or other measurable human characteristics), one or more cameras 170, and a treadmill 180 for detecting walking or running movements of the user 102. In addition to the user interface 112, in some embodiments, the VR device 110 may include some or all of the corresponding hardware components (e.g., motion sensors, biometric sensors, cameras and a treadmill), although it will be understood that any of these hardware components may be provided separately from the VR device 110. For example, the VR device 110 may be incorporated into a VR headset having head motion sensors and cameras, while a VR hand glove, treadmill and at least some of the biometric sensors may be separate components electronically coupled to the VR device 110 via wired or wireless connections. Numerous configurations of the VR device 110 will be apparent in light of this disclosure.

The inputs 104a-104n from the user 102 to the VR device 110 via the user interface 112, including inputs to the VR application 140, occur when the user 102 interacts with the VR device 110 to perform various functions. For example, certain head movement inputs by the user 102 (e.g., via a VR headset with integrated motion sensors) can cause the VR device 110 to change the scene so that the user can look around the virtual environment in a natural manner. Likewise, certain hand movement inputs by the user 102 (e.g., via a VR hand glove with integrated motion sensors) can cause the VR device 110 to simulate the movement of objects in the virtual environment as if the objects were actually being manipulated by the user 102. In another example, user inputs can be mapped to certain functions of the VR device 110. For instance, certain head or hand movements may be mapped to changing the audio volume or screen brightness of a VR headset, activating email, pausing or starting a game, scrolling between photos in an album or between pages of a document, focusing on an advertisement or news headline, zooming a display, applying a rating, saving a document, closing a display window, taking a picture with a camera, answering a call, and so forth.

The interactions between the user 102 and the VR device 110 are measured in a granular manner. For example, the interface with the motion sensors 150 may be used to detect head nods (e.g., left, right, up and down head movements), hand gestures (e.g., waves, taps, pickups or grabs, pushes and pulls, thumbs up or down, hand tilts, throws, claps, swipes, finger pinches and sign language motions), physical fingerprints, voice commands, eye movements (e.g., blink rate and gaze direction), heart rate, and any other characteristic of the user 102 that is measurable by the VR device 110, including the speed or rate at which the interactions occur. More generally, the interactions between the user 102 and the VR device 110 can be detected, recorded and analyzed on the VR device 110, the server 120, or a combination of both using any suitable software and hardware. For example, the virtual reality application 140 may include or be in communication with operating system software executing on the VR device 110, which permits the acquisition of data from the various sensors, cameras, etc., via the user interface 112.

Data representing the interactions between the user 102 and the VR device 110, once captured or measured by the VR device 110, are sent from the VR device 110 to the server 120 for statistical analysis, which is used to generate one or more visitor fingerprints 124, as described below with respect to FIG. 3. In an embodiment, the interaction data are sent from the VR device 110 to the server 120 via a communications network 122. The communications network 122 is configured to permit the VR device 110 and the server 120 to communicate electronically over any suitable wired or wireless link.

Figure 3:
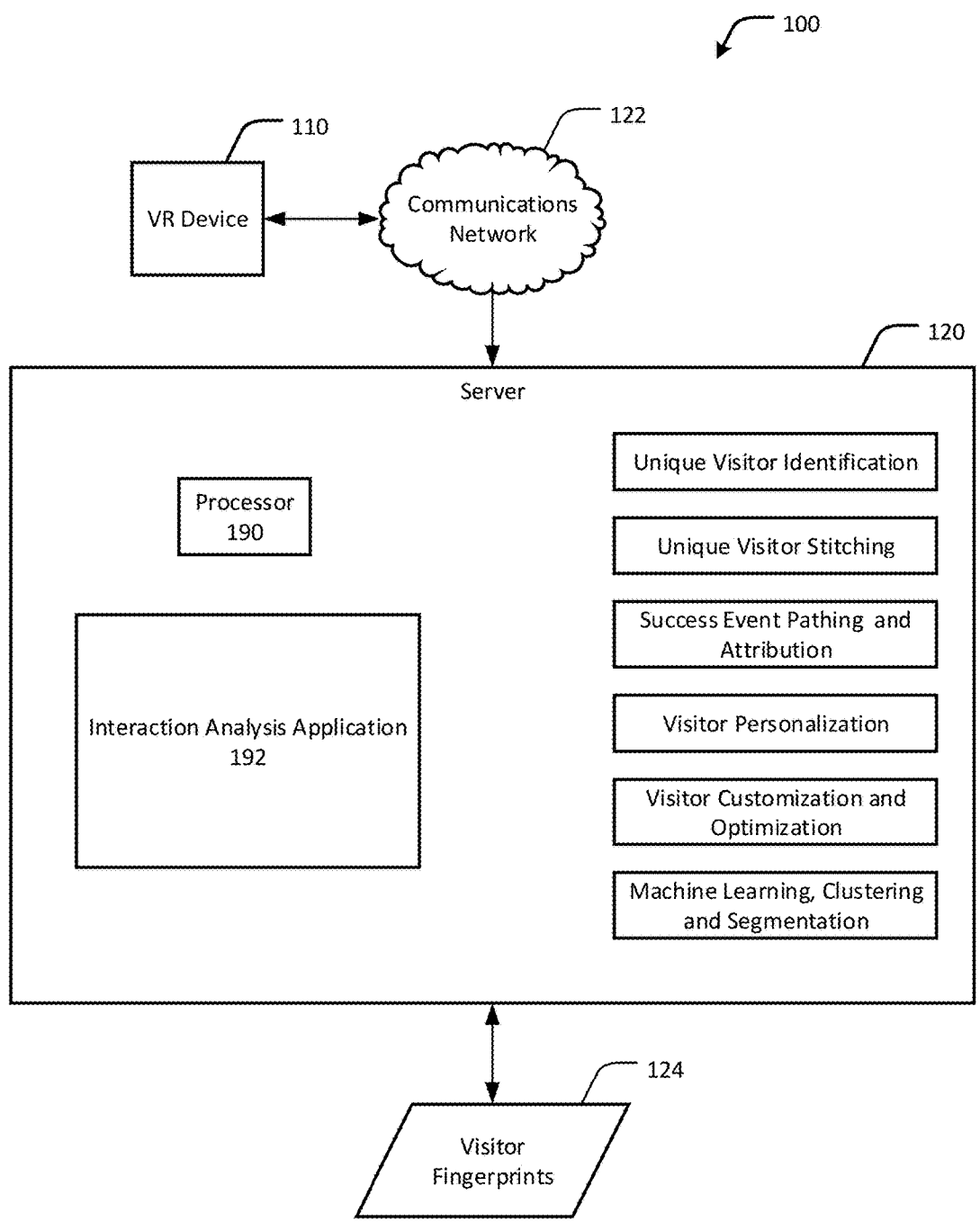
FIG. 3 illustrates another detailed view of the example system of FIG. 1 including a server, in accordance with an embodiment of the present disclosure.

FIG. 3 illustrates a detailed view of the example server 120 of FIG. 1, in accordance with an embodiment of the present disclosure. The server 120 includes one or more processors 190 configured to execute an interaction analysis application 192. The interaction analysis application 192 is configured to receive the interaction data from the VR device 110 via the communications network 122. The interaction analysis application 192 is further configured to generate one or more visitor fingerprints 124 based on the interaction data. The visitor fingerprints 124 represent distinctive usage patterns of the VR device 110 by the user 102.

For example, a particular sequence of interactions (e.g., head or hand gestures) alone or in combination with certain settings of the VR device 110 (e.g., screen brightness or audio volume) can be analyzed to generate a pattern, referred to as a visitor fingerprint 124. Each visitor fingerprint 124 may uniquely identify a particular user 102 such that different visitor fingerprints 124 uniquely identify different users 102. If a particular visitor fingerprint 124 does not exist, it is created and stored in a database for comparison with subsequently generated visitor fingerprints. In this manner, by comparing the statistics generated from the interaction data to a previously generated and stored visitor fingerprint 124, the interaction analysis application 192 can estimate the identity of the user 102 interacting with the VR device 110 during a given user visit from usage patterns, even if no personally identifiable information is otherwise available. For example, if the visitor fingerprint 124 of User A indicates that the user typically rests his head in a right-leaning direction, and the visitor fingerprint 124 of User B indicates that the user typically rests her head in an upright position, then interactions with the VR device 110 in which the user frequently holds his or her head in an upright position may indicate that User B, rather than User A, is actively using the VR device 110. In general, the more interactions that are measured, the more accurately the interaction analysis application 192 estimates the identity of the user 102. If PII is available, then the confidence that a particular user 102 is using the VR device 110 increases. In an embodiment, some or all of the functions performed by the interaction analysis application 192 may instead be performed by the VR device 110.

As discussed above with respect to FIG. 1, the statistics generated by the interaction analysis application 192 from the interaction data can be used to provide a number of services, including but not limited to unique visitor identification, unique visitor stitching, success event pathing and attribution, visitor personalization, visitor customization and optimization, machine learning, clustering and segmentation.

Unique Visitor Identification and Stitching

Once a visitor fingerprint 192 has been established, it can then be used to differentiate between multiple users or to stitch together users across multiple VR devices. Stitching refers to a process of correlating the users of multiple devices based on interactions between the users and the devices. For example, if a particular User A is identified as using Device A and Device B by comparing visitor fingerprints obtained from both devices, then the interactions between User A and Devices A and B can be correlated across all devices. This can enable common metrics such as obtaining a unique user count (e.g., a common metric for most application is to determine how many people are using the application), determining the average number of users per VR device, and determining the average number of VR devices per user. For example, the total number of unique visitors for a given VR device can also be used to calculate a global total number of unique visitors for a given type of device (e.g., a total number of users of a particular model of VR device), for the manufacturer of the device (e.g., a total number of users of device manufactured by a particular company), or for a given type of product (e.g., a total number of users of VR devices in general). Visitor stitching can also be used to transfer or synchronize data between multiple VR devices that are used by the same user(s). Examples of such data include application configuration, device settings, user preferences and application data (e.g., game status). Visitor stitching can also be used to augment the functionality of the VR devices, such as to provide advertising targeted to a particular user as the user interacts with different devices.

Success Event Pathing and Attribution

As visitors move between VR devices, it becomes challenging to identify the entire path they have followed to measured success events. Visitor stitching across VR devices enables the complete paths to be discovered and all channels to receive credit for their contribution to success events. Device pathing is useful in VR applications. In an embodiment, an attribution engine can be configured to see the complete path the user has taken to get to a specific success event. For example, perhaps a developer is trying to drive the user to downloading a new game. Let's say the user puts on headset 1 and uses app 1, app 2, and app 3. In each of these apps, the user sees some kind of ad for the target game. In app 1, it may be a banner ad. In app 2, it may be graffiti on the wall of some game. In app 3 it may be an in-app recommendation based on behavior in that app. Next, the user puts on headset 2, which has a mobile phone mounted in a cardboard box. On headset 2, the user uses app4 and app2 again. App 2 once again shows the graffiti for the target game, but app4 does not contain any information that would push the user towards the target game. Finally, the user puts on headset 3, uses app 5 which shows an ad for the target game and clicks to download the game. Without the full path and visitor stitching, the developer or marketer would give all credit to the ad in app5 and may make poor decisions based on this incomplete information (such as putting all available money into that app or ad) and may not get the results they hoped for. In reality, perhaps the graffiti ad in app2 was the biggest influencer, yet it did not get any credit for the conversion and the marketer may not invest in other graffiti ads. With visitor stitching and cross device cross app pathing, the marketer can receive better information. For example, the full path may include:

Device 1
  a. App 1
    i. Ad (shown 3 times)
  b. App 2
    i. Graffiti—viewed 5 times
  c. App 3
    i. Recommendation
Device 2
  a. App 2
    i. Ad (shown 2 times)
  b. App 5
Device 3
  a. App 5
    i. Ad shown once
  b. Conversion Now all steps in the path can receive some credit. Different attribution algorithms may divide the credit differently. For instance, it may be appropriate to give headset 1 and app 5 the most credit since it may have directly led to the conversion. The algorithm may also compare similar paths to determine that app 5 should not receive any credit at all. There was no recorded marketing effort—but that does not necessarily mean that it should not receive credit. Perhaps it is a very similar game to the target game and it may have been the largest influencer despite the lack of a marketing touch point. Comparing to other paths can help to determine whether it was valuable or not.

Visitor Personalization

When a marketer or a developer can distinguish between users, they can also personalize the experience to the user. For example, the marketer may segment users into experiences or customize the experience directly to the specific user. They may change the advertising or experience to appeal more to the user and provide a better overall experience. For instance, one user may be presented with a more graphic experience than another based on their visitor fingerprint and observed preferences.

Visitor Customization and Optimization

The VR application 140 or VR device 110 can optimize the experience for the user 102 to provide a better experience. For example, different users may have different preferences such as head movement sensitivity. Many applications and devices allow users to create profiles for storing their setting preferences. If the VR application 140 or VR device 110 is able to uniquely identify users 102 and distinguish them from each other, the application 140 can create preference profiles automatically and switch between them automatically so that each user 102 has a personalized experience. Such personalization may be based, for example, on the way the user 102 interacts with the VR application 140 or the VR device 110. For example, if the user 102 always adjusts the volume to a certain level, the VR device 110 could automatically adjust the volume once the user 102 is identified during a subsequent visit or subsequent interaction during a current visit. Other optimizations may include, for example, changing the camera angle based on the neutral head position (e.g., if a person's neutral head position is to look more downward than most, it may be fatiguing to maintain a more upward posture in order to see the primary content). The system 100 can detect the user's natural neutral head position and automatically adjust the camera angle and initialize an accelerometer and gyroscope to compensate for the user's natural neutral head position, to present the primary content at that angle. In another example, the VR device 110 or VR application 140 may be optimized automatically by adjusting the head movement sensitivity (e.g., some users may nod more vigorously or subtly than others). In another example, just as many game controllers and phones allow for differing pressure sensitivities on the screen or buttons, the VR device 110 or VR application 140 may be adjusted based on the speed and distance of a nod or other head movement. Having to frequently repeat uncomfortable head movements could quickly fatigue the user. In another example, cameras can be used to recognize the physical environment of the user and determine the identity of the user based on the recognized environment. For example, if a user typically uses a VR device in a game room, the system may automatically recognize that the furniture and colors of the room are the same for the current visit as for a prior visit, and associate the users of both visits as being the same user.

Machine Learning, Clustering and Segmentation

As analytics systems correctly track interactions and associate those actions with unique identifiers, they enable the ability to analyze and cluster data based on the measured attributes. As VR gestures and interactions are measured and appropriately correlated, it will enable marketers to better understand and target their customers as well as enabling developers and manufactures to better understand how their products are used.

Example Methodologies

Figure 4A:
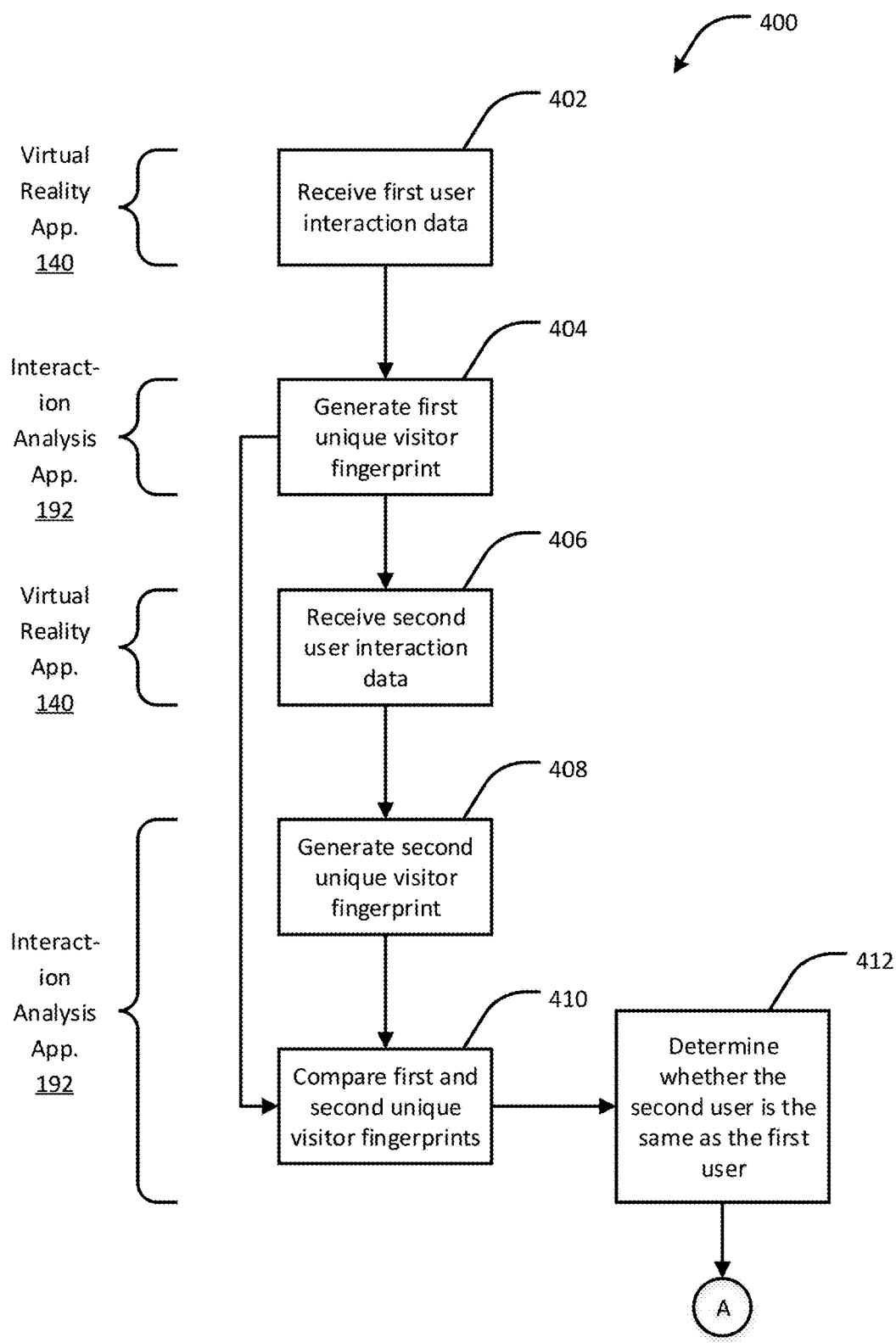
FIG. 4A is a flow diagram of an example methodology for identifying a user of a VR device, in accordance with an embodiment of the present disclosure.

FIG. 4A is a flow diagram of an example methodology 400 for identifying a user of a virtual reality device, in accordance with an embodiment of the present disclosure. The methodology 400 may be performed, for example, by the VR interaction analysis application 192 of FIG. 3, the virtual reality application 140, or both in combination. The method 400 includes receiving 402, by a computer processor and from at least one virtual reality device, first user interaction data representing a first plurality of interactions between a first user and the at least one virtual reality device during a first user visit. The at least one virtual reality device is configured to generate at least one of realistic images, sounds and other sensations that replicate a real or imagined environment. For example, the first user may interact with the VR device in any number of different ways, including moving a VR headset to look around a virtual environment, moving a VR hand glove to manipulate virtual objects in the environment, or selecting user preferences for the VR device or an application executing on the device. The method 400 further includes generating 404, by the processor, a first unique visitor fingerprint based on the first user interaction data. The method 400 further includes receiving 406, by the processor and from the at least one virtual reality device, second user interaction data representing a second plurality of interactions between a second user and the at least one virtual reality device during a second user visit that is different from the first user visit. For example, the second user may interact with the VR device in a manner that is similar to or distinct from the manner in which the first user previously interacted with the VR device. The method 400 further includes generating 408, by the processor, a second unique visitor fingerprint based on the second user interaction data. It will be understood that any number of unique visitor fingerprints (third, fourth, etc.) may be generated and used in this method to further improve the resolution and accuracy of the result. In some embodiments, only the first unique visitor fingerprint is needed, and the acts of receiving 406 and generating 408 may be bypassed. The method 400 further includes comparing 410, by the processor, the first and second unique visitor fingerprints to determine 412 whether or not the second user is the same as the first user based on the comparison. In the case where only the first unique visitor fingerprint is generated, the second unique visitor fingerprint may include, for example, another visitor fingerprint generated at a prior time by a different user. For example, the comparison may yield information about whether the user moves his head faster or slower than one or more other users. Thus, even upon the first visit by a particular user, the system could check with the server and find that most people with similar head movement speeds prefer a specific scroll setting, and the system may adjust the user's setting accordingly.

Figure 4B:
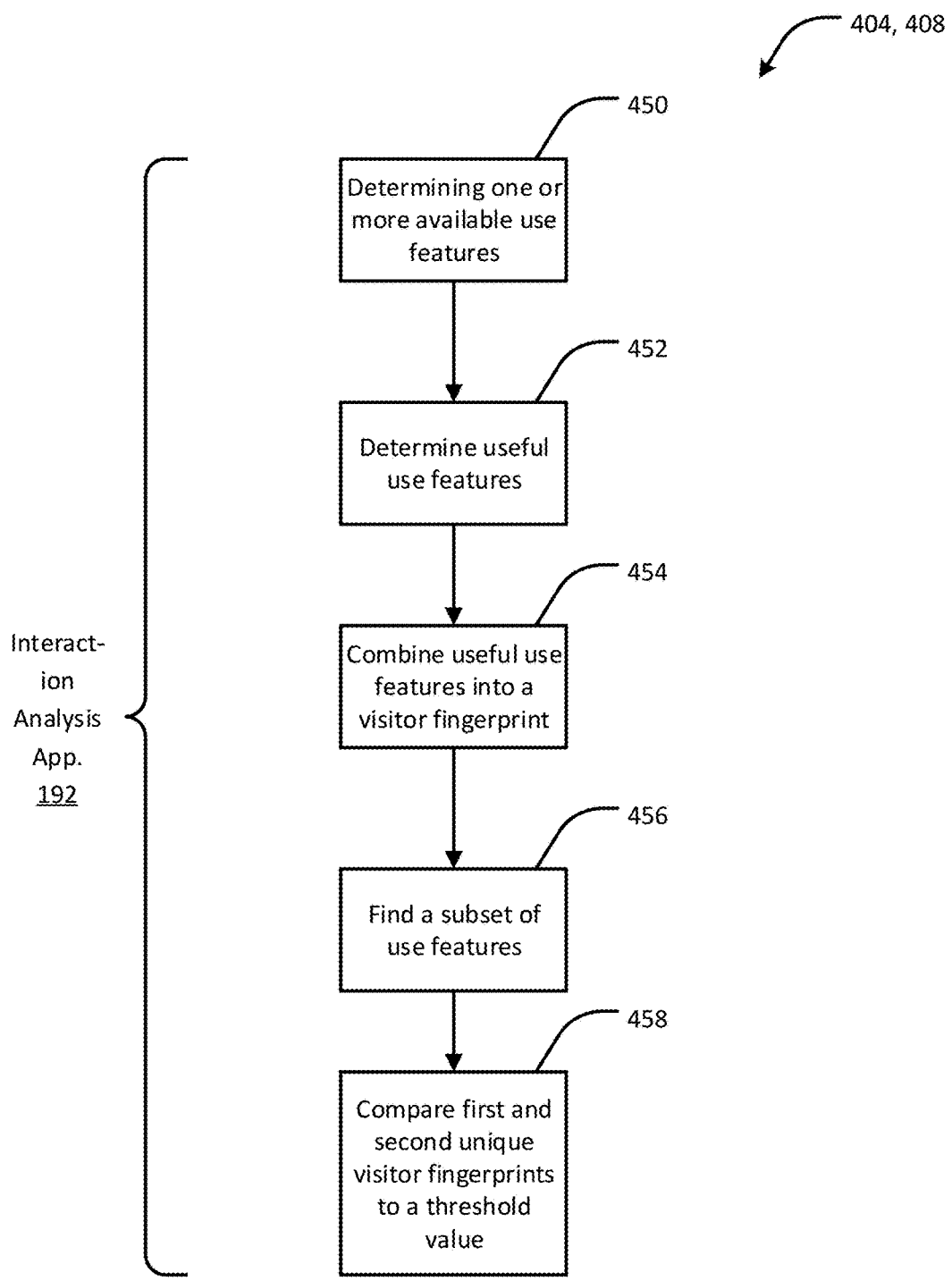
FIG. 4B is a flow diagram of an example methodology for generating a first or second unique visitor fingerprint, in accordance with an embodiment of the present disclosure.

FIG. 4B is a flow diagram of an example methodology 404, 408 for generating a first or second unique visitor fingerprint, in accordance with an embodiment of the present disclosure. The method 404, 408 includes generating 404, 408 the first or second unique visitor fingerprint based on the first user interaction data includes determining 450 one or more available use features to include in the visitor fingerprint. The available use features are features that can be obtained, measured and collected from, for example, the VR device 110, and may include, for example, head movement, hand movement, eye movement, biometric information, head movement detection sensitivity, scroll speed, user interface-to-function mappings, headphone volume, microphone volume, screen brightness, configuration settings, application settings, and behavior (e.g., in a given game, the user may always check his statistics first and his game inventory, second, etc.), or any combination of these use features.

The method 404, 408 further includes determining 452 which of the available features are useful. To be useful, a use feature may have a somewhat consistent value. For example, head angle may be quite useful when it is unique to the user (e.g., the user tends to lean his head forward), or it may be less useful when the user tends to hold their head in various different angles (e.g., the head position of the user is not consistent or predictable). However, even if the value of the use feature is consistent, it may not be useful. For example, if a Boolean setting for a particular value is set to true for 99.9% of users, it's not useful for uniquely identifying 99.9% of the users. However, such a value may be very useful for fingerprinting when set to false for 99.9% of users.

The method 404, 408 further includes, for example, combining 454 the useful use features into a fingerprint. For example, the combining 454 may include generating an array of key-value pairs of the useful use feature values. In another example, the combining 454 may include translating the useful use feature values into a bit string where each bit represents a key and a specific value (these end up being extremely long bit strings but make it trivial to determine how similar two fingerprints are). Other examples will be apparent in view of this disclosure.

As a combination of the last two points, the method 404, 408 further includes finding 456 a subset of the use features that best describes a range over which comparison can be successfully made. The subset of use features is used to compare the first and second visitor fingerprints. For example, if a timestamp when an application was launched is one of the use features, the timestamp would always make visitors look different since they could never start two sessions with the same time stamp. However, time of day may provide more useful information for determining unique visitors. This step may be accomplished, for example, using machine learning techniques. In some embodiments, the method 404, 408 includes comparing 458 the probability that two or more visitor fingerprints belong to the same user to a threshold value, where if all of the visitor fingerprints surpass the threshold value, the confidence that the visitor fingerprints belong to the same visitor increases.

In an embodiment, the first and second plurality of user interactions includes one or more behavioral acts of the first and second user, respectively, including but not limited to head movement, hand movement, eye movement, biometric information, head movement detection sensitivity, scroll speed, user interface-to-function mappings, headphone volume, microphone volume, and screen brightness. It will be understood that any user input or behavioral act that can be detected by the VR device may be considered a user interaction, depending on the capabilities of the device.

Figure 5:
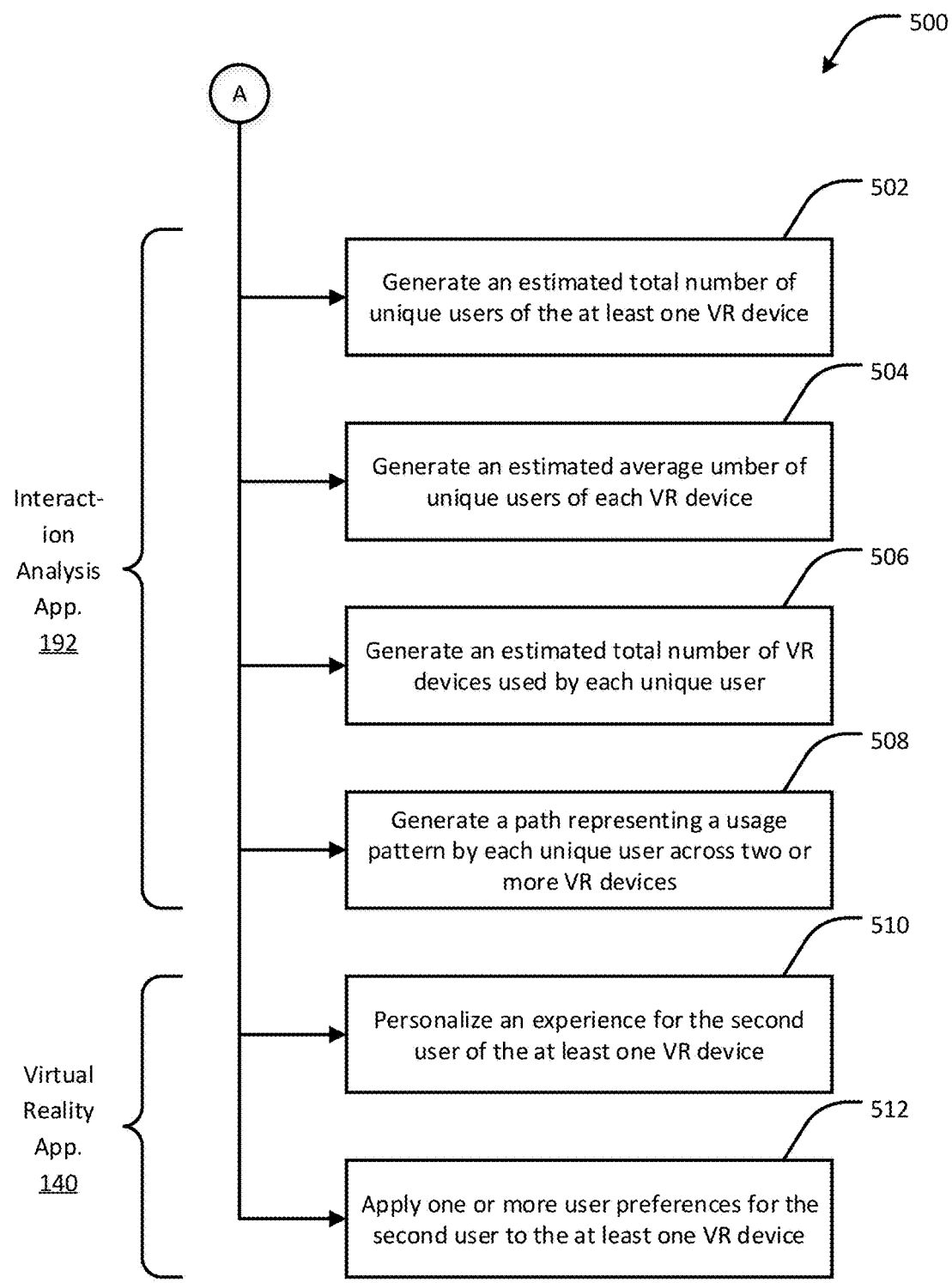
FIG. 5 is a flow diagram of several example methodologies for performing various functions based on an identified user of a VR device, in accordance with an embodiment of the present disclosure.

FIG. 5 is a flow diagram of several example methodologies 500 for performing various functions based on the first and second unique visitor fingerprints. In accordance with an embodiment of the present disclosure, the method 500 includes generating 502, by the processor, an estimated total number of unique users of the at least one virtual reality device based on the first and second unique visitor fingerprints. In another embodiment, the method 500 includes generating 504, by the processor, an estimated average number of unique users of each virtual reality device based on the first and second unique visitor fingerprints. In yet another embodiment, the method 500 includes generating 506, by the processor, an estimated total number of virtual reality devices used by each unique user based on the first and second unique visitor fingerprints. In yet another embodiment, the method 500 includes generating 508, by the processor, a path representing a usage pattern by each unique user across two or more virtual reality devices based on the first and second unique visitor fingerprints. In yet another embodiment, the method 500 includes personalizing 510, by the processor, an experience for the second user using the at least one virtual reality device based on a determination that the second user is the same as the first user. In yet another embodiment, the method 500 includes applying 512, by the processor, one or more user preferences for the second user to the at least one virtual reality device based on a determination that the second user is the same as the first user.

Figure 6:
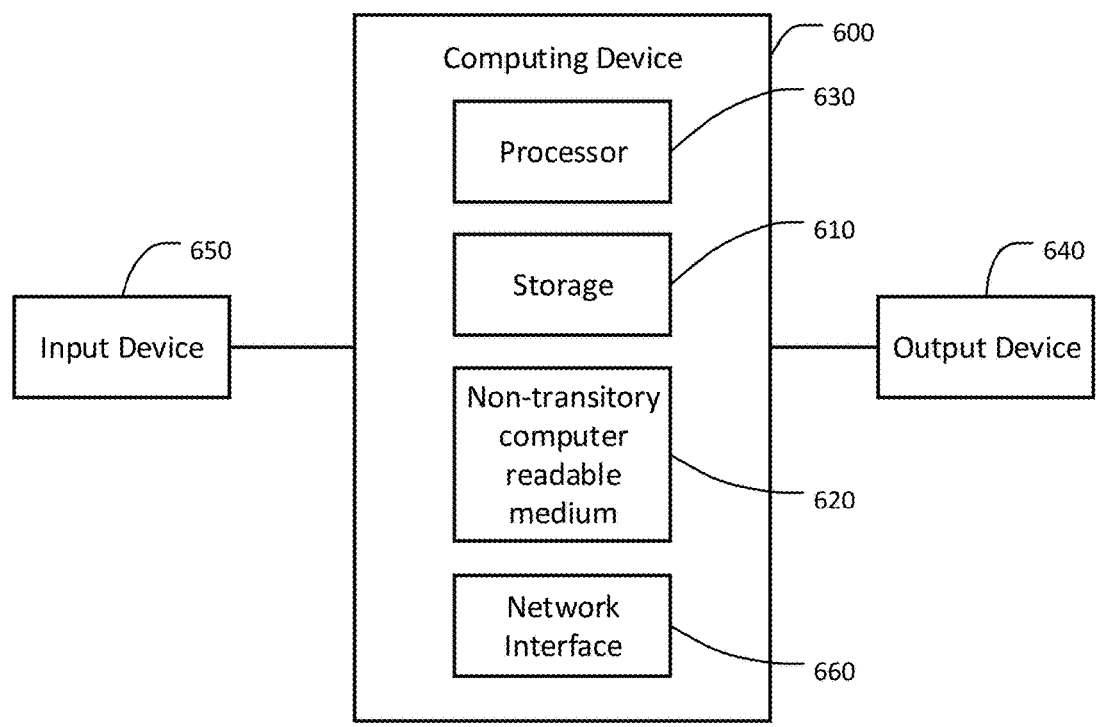
FIG. 6 is a block diagram representing an example computing device that may be used to perform any of the techniques as variously described in this disclosure.

FIG. 6 is a block diagram representing an example computing device 600 that may be used to perform any of the techniques as variously described in this disclosure. For example, the system 100 of FIG. 1, or any portions thereof, and the methodologies of FIGS. 4 and 5, or any portions thereof, may be implemented in the computing device 600. The computing device 600 may be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), VR device or VR component (e.g., headset, hand glove, camera, treadmill, etc.) or other form of computing or telecommunications device that is capable of communication and that has sufficient processor power and memory capacity to perform the operations described in this disclosure. A distributed computational system may be provided including a plurality of such computing devices.

The computing device 600 includes one or more storage devices 610 or non-transitory computer-readable media 620 having encoded thereon one or more computer-executable instructions or software for implementing techniques as variously described in this disclosure. The storage devices 610 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions or software that implement various embodiments as taught in this disclosure. The storage device 610 may include other types of memory as well, or combinations thereof. The storage device 610 may be provided on the computing device 600 or provided separately or remotely from the computing device 600. The non-transitory computer-readable media 620 may include, but are not limited to, one or more types of hardware memory, non-transitory tangible media (for example, one or more magnetic storage disks, one or more optical disks, one or more USB flash drives), and the like. The non-transitory computer-readable media 620 included in the computing device 600 may store computer-readable and computer-executable instructions or software for implementing various embodiments. The computer-readable media 620 may be provided on the computing device 600 or provided separately or remotely from the computing device 600.

The computing device 600 also includes at least one processor 630 for executing computer-readable and computer-executable instructions or software stored in the storage device 610 or non-transitory computer-readable media 620 and other programs for controlling system hardware. Virtualization may be employed in the computing device 600 so that infrastructure and resources in the computing device 600 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 600 through an output device 640, such as a screen or monitor, which may display one or more user interfaces provided in accordance with some embodiments. The output device 640 may also display other aspects, elements or information or data associated with some embodiments. The computing device 600 may include other I/O devices 650 for receiving input from a user, for example, a keyboard, a joystick, a game controller, a pointing device (e.g., a mouse, a user's finger interfacing directly with a touch-sensitive display device, etc.), or any suitable user interface. The computing device 600 may include other suitable conventional I/O peripherals. The computing device 600 includes or is operatively coupled to various suitable devices for performing one or more of the aspects as variously described in this disclosure.

The computing device 600 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 600 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system, such as the VR application 140, the GUI 142, the user interface 112, the interaction analysis application 192, or any combination of these, is implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transitory memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors or databases in different configurations and arrangements, and that the depicted embodiments are not intended to be limiting. Various components of this example embodiment, including the computing device 600, may be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described herein can be combined in any number of configurations. One example embodiment provides a computer-implemented method of identifying a user of a virtual reality device. The method includes receiving, from at least one virtual reality device, first user interaction data representing a first plurality of interactions between a first user and the at least one virtual reality device during a first user visit, where the at least one virtual reality device is configured to generate realistic images, sounds and/or other sensations that replicate a real or imagined environment. The method further includes a step for generating a first unique visitor fingerprint based on the first user interaction data; receiving, from the at least one virtual reality device, second user interaction data representing a second plurality of interactions between a second user and the at least one virtual reality device during a second user visit that is different from the first user visit; a step for generating a second unique visitor fingerprint based on the second user interaction data; comparing the first and second unique visitor fingerprints; and determining whether or not the second user is the same as the first user based on the comparison. In some cases, the method includes generating an estimated total number of unique users of the at least one virtual reality device based on the first and second unique visitor fingerprints. In some cases, the method includes generating an estimated total number of virtual reality devices used by each unique user based on the first and second unique visitor fingerprints. In some cases, the method includes generating a path representing a usage pattern by each unique user across two or more virtual reality devices based on the first and second unique visitor fingerprints. In some cases, the method includes personalizing an experience for the second user using the at least one virtual reality device based on a determination that the second user is the same as the first user. In some cases, the method includes applying one or more user preferences for the second user to the at least one virtual reality device based on a determination that the second user is the same as the first user. In some cases, the first plurality of user interactions includes at least one of: head movement; hand movement; eye movement; biometric information; head movement detection sensitivity; scroll speed; user interface-to-function mappings; headphone volume; microphone volume; screen brightness; a device configuration setting; and an application setting. In some cases, generating at least one of the first and second unique visitor fingerprints based on the first and second user interaction data, respectively, includes determining one or more available use features of the virtual reality device; determining which of the one or more available use features are useful for generating one or both of the first and second visitor fingerprints; combining the useful use features into one or both of the first and second visitor fingerprints; and finding a subset of use features that describes a range over which comparison of one or both of the first and second visitor fingerprints can be successfully made, wherein the subset of use features is used to compare the first and second visitor fingerprints. Another example embodiment provides a non-transitory computer program product having instructions encoded thereon that when executed by one or more computer processors cause the one or more computer processors to perform a process such as set forth in this paragraph.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method of identifying a user of a virtual reality device, the method comprising:
receiving, from at least one virtual reality device, first user interaction data representing a first plurality of interactions between a first user and the at least one virtual reality device during a first user visit, the at least one virtual reality device configured to generate at least one of realistic images, sounds and other sensations that replicate a real or imagined environment;
a step for generating a first unique visitor fingerprint based on the first user interaction data;
receiving, from the at least one virtual reality device, second user interaction data representing a second plurality of interactions between a second user and the at least one virtual reality device during a second user visit that is different from the first user visit;
a step for generating a second unique visitor fingerprint based on the second user interaction data;
comparing the first and second unique visitor fingerprints;
determining whether or not the second user is the same as the first user based on the comparison; and
at least one of:
generating an estimated total number of unique users of the at least one virtual reality device based on the first and second unique visitor fingerprints;
generating an estimated total number of virtual reality devices used by each unique user based on the first and second unique visitor fingerprints; and
generating a path representing a usage pattern by each unique user across two or more virtual reality devices based on the first and second unique visitor fingerprints.

2. The method of claim 1, further comprising:
personalizing an experience for the second user using the at least one virtual reality device based on a determination that the second user is the same as the first user.

3. The method of claim 1, further comprising:
applying one or more user preferences for the second user to the at least one virtual reality device based on a determination that the second user is the same as the first user.

4. The method of claim 1, wherein the first plurality of user interactions includes at least one of:
head movement;
hand movement;
eye movement;
biometric information;
head movement detection sensitivity;
scroll speed;
user interface-to-function mappings;
headphone volume;
microphone volume;
screen brightness;
a device configuration setting; and
an application setting.

5. The method of claim 1, wherein generating at least one of the first and second unique visitor fingerprints based on the first and second user interaction data, respectively, includes:
determining one or more available use features of the virtual reality device;

determining which of the one or more available use features are useful for generating one or both of the first and second visitor fingerprints;

combining the useful use features into one or both of the first and second visitor fingerprints; and finding a subset of use features that describes a range over which comparison of one or both of the first and second visitor fingerprints can be successfully made, wherein the subset of use features is used to compare the first and second visitor fingerprints.

6. A system for identifying a user of a virtual reality device, the system comprising:

a storage; and a processor operatively coupled to the storage, the processor configured to execute instructions stored in the storage that when executed cause the processor to carry out a process including receiving, from at least one virtual reality device, first user interaction data representing a first plurality of interactions between a first user and the at least one virtual reality device during a first user visit, the at least one virtual reality device configured to generate at least one of realistic images, sounds and other sensations that replicate a real or imagined environment;

generating a first unique visitor fingerprint based on the first user interaction data;

receiving, from the at least one virtual reality device, second user interaction data representing a second plurality of interactions between a second user and the at least one virtual reality device during a second user visit that is different from the first user visit;

generating a second unique visitor fingerprint based on the second user interaction data;

comparing the first and second unique visitor fingerprints; and determining whether or not the second user is the same as the first user based on the comparison, wherein generating at least one of the first and second unique visitor fingerprints based on the first and second user interaction data, respectively includes:

determining one or more available use features of the virtual reality device;

determining which of the one or more available use features are useful for generating one or both of the first and second visitor fingerprints;

combining the useful use features into one or both of the first and second visitor fingerprints; and finding a subset of use features that describes a range over which comparison of one or both of the first and second visitor fingerprints can be successfully made, wherein the subset of use features is used to compare the first and second visitor fingerprints.

7. The system of claim 6, wherein the process further comprises:

generating, by the processor, an estimated total number of unique users of the at least one virtual reality device based on the first and second unique visitor fingerprints.

8. The system of claim 6, wherein the process further comprises:

generating, by the processor, an estimated average number of unique users of each virtual reality device based on the first and second unique visitor fingerprints.

9. The system of claim 6, wherein the process further comprises:

generating, by the processor, a path representing a usage pattern by each unique user across two or more virtual reality devices based on the first and second unique visitor fingerprints.

10. The system of claim 6, wherein the process further comprises:

personalizing, by the processor, an experience for the second user using the at least one virtual reality device based on a determination that the second user is the same as the first user.

11. The system of claim 6, wherein the process further comprises:

applying, by the processor, one or more user preferences for the second user to the at least one virtual reality device based on a determination that the second user is the same as the first user.

12. A non-transitory computer readable medium having instructions encoded thereon that when executed by one or more computer processors cause the one or more computer processors to perform a process comprising:

receiving, from at least one virtual reality device, first user interaction data representing a first plurality of interactions between a first user and the at least one virtual reality device during a first user visit, the at least one virtual reality device configured to generate at least one of realistic images, sounds and other sensations that replicate a real or imagined environment;

generating a first unique visitor fingerprint based on the first user interaction data;

receiving, from the at least one virtual reality device, second user interaction data representing a second plurality of interactions between a second user and the at least one virtual reality device during a second user visit that is different from the first user visit;

generating a second unique visitor fingerprint based on the second user interaction data;

comparing the first and second unique visitor fingerprints;

determining whether or not the second user is the same as the first user based on the comparison; and at least one of:

generating an estimated total number of unique users of the at least one virtual reality device based on the first and second unique visitor fingerprints;

generating an estimated average number of unique users of each virtual reality device based on the first and second unique visitor fingerprints; and generating an estimated total number of virtual reality devices used by each unique user based on the first and second unique visitor fingerprints.

13. The non-transitory computer readable medium of claim 12, wherein the process further comprises:

personalizing an experience for the second user using the at least one virtual reality device based on a determination that the second user is the same as the first user.

14. The non-transitory computer readable medium of claim 12, wherein the process further comprises:

generating a path representing a usage pattern by each unique user across two or more virtual reality devices based on the first and second unique visitor fingerprints.

15. The non-transitory computer readable medium of claim 12, wherein the process further comprises:

personalizing an experience for the second user using the at least one virtual reality device based on a determination that the second user is the same as the first user.

16. The non-transitory computer readable medium of claim 12, wherein the process further comprises:

applying one or more user preferences for the second user to the at least one virtual reality device based on a determination that the second user is the same as the first user.

17. The non-transitory computer readable medium of claim 12, wherein generating at least one of the first and second unique visitor fingerprints based on the first and second user interaction data, respectively, includes:
   determining one or more available use features of the virtual reality device;
   determining which of the one or more available use features are useful for generating one or both of the first and second visitor fingerprints;
   combining the useful use features into one or both of the first and second visitor fingerprints; and
   finding a subset of use features that describes a range over which comparison of one or both of the first and second visitor fingerprints can be successfully made, wherein the subset of use features is used to compare the first and second visitor fingerprints.

* * * * *